W. A. ESTES.
TRUCK.

No. 171,367. Patented Dec. 21, 1875.

WITNESSES.
H. S. Talbot
Edward Edmunds

INVENTOR.
William A. Estes
Per Sylvenus Walker
Att'y

UNITED STATES PATENT OFFICE.

WILLIAM A. ESTES, OF CHINA, MAINE.

IMPROVEMENT IN TRUCKS.

Specification forming part of Letters Patent No. 171,367, dated December 21, 1875; application filed May 3, 1875.

*To all whom it may concern:*

Be it known that I, WILLIAM A. ESTES, of China, in the county of Kennebec and State of Maine, have invented certain new and useful Improvements in Stone-Conveying Trucks, of which the following is a specification:

The object of my invention is to provide an anti-friction means for conveying any large heavy mass, like stone, such as have heretofore been loaded upon a "drag," or stone-boat, to be conveyed a short distance for building stone wall, and the like purposes; but on account of the great friction created by moving such flat-bottomed drag over the ground when heavy loads are placed upon it, several devices have been sought to overcome the friction necessarily resulting from such conveyances, with only partial success. My invention is designed to overcome such objections; and it consists, mainly, in the peculiar combination and arrangement of several series of small friction wheels or rolls, within a suitably constructed frame, as hereinafter described.

Figure 1:
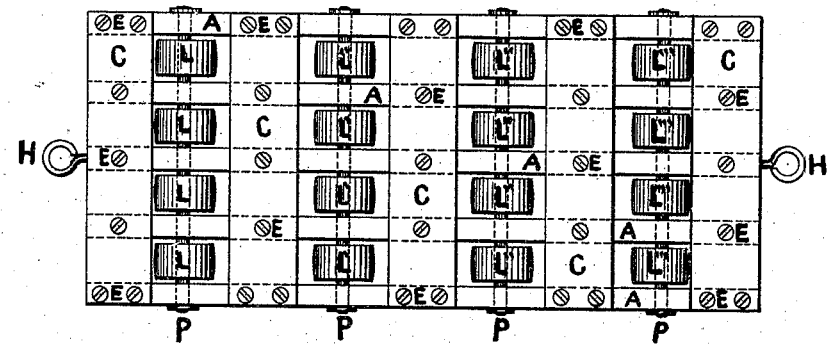
Figure 2:
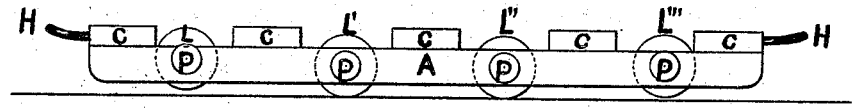

Figure 1 is a top-plan view of my invention. Fig. 2 is a side elevation of the same.

A A A are a series of timbers placed parallel with each other, with spaces B intervening. C C C are a series of planks running across the pieces A A A at right angles, and securely fastened together by bolts E, or other suitable manner, to make a strong rigid framework, with several series of openings, B. Into these openings are arranged the crown-faced wheels L L' L'' L''', in series of four or more each, their under sides projecting a short distance below the pieces A. The central series L' L'' project more than those of L or L''', so as to present a curved bearing-surface, which will allow the same to be turned or moved around in a circle, if desirable; at the same time have a steady bearing upon the ground, as the two central series of wheels furnish a steady bearing upon the ground at all times, and in turning around by the several wheels upon one rod or bearing, part of the wheels move in one direction, and the others in another, by which means the device has a steady bearing upon the ground at all times. For this reason it is necessary to have two series of wheels in a central position upon the frame, while the two end series, being on a line above the level of the central series, a firm bearing is furnished at either end when the device is loaded heavily at either end, and the device furnished with two series of bearing-wheels at all times. These wheels L are secured within the framing by journal bolts or rods P, which pass through the parallel pieces A and the hub of the wheels L, which revolve upon the said rods P as axles or journals. To the end pieces C are secured an eye, H, by which the same may be drawn in the usual manner by means of a chain, to attach the oxen or horses thereto.

I am well aware that Letters Patent were granted John H. Moore April 21, 1868, for a device for moving buildings. I, therefore, broadly disclaim such.

Having thus described my invention, what I claim is—

The series of parallel bars A, cross bars or pieces C, in combination with the anti-friction wheels L L' L'' L''', the two central series being on a line with each other, furnishing a steady bearing for the device when in a level position, and the two outer series being on a line above the central series, whereby a support for the ends of the device is furnished, and whereby there are two series of wheels on the ground all the time, all constructed and arranged as and for the purpose specified.

WILLIAM A. ESTES.

Witnesses:
P. W. SMITH,
A. R. MARTIN.